United States Patent
Orihashi et al.

(10) Patent No.: US 11,807,126 B2
(45) Date of Patent: Nov. 7, 2023

(54) POWER MANAGEMENT APPARATUS AND POWER MANAGEMENT METHOD

(71) Applicant: TOYOTA JIDOSHA KABUSHIKI KAISHA, Toyota (JP)

(72) Inventors: Nobuyuki Orihashi, Toyota (JP); Shigeki Kinomura, Toyota (JP); Tamaki Ozawa, Toyota (JP); Chiaki Kanda, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 17/526,528

(22) Filed: Nov. 15, 2021

(65) Prior Publication Data
US 2022/0194252 A1    Jun. 23, 2022

(30) Foreign Application Priority Data
Dec. 22, 2020    (JP) ................. 2020-212517

(51) Int. Cl.
| | | |
|---|---|---|
| *B60L 53/63* | (2019.01) | |
| *B60L 58/30* | (2019.01) | |
| *B60L 53/62* | (2019.01) | |
| *B60L 53/66* | (2019.01) | |
| *B60L 58/40* | (2019.01) | |
| *B60L 55/00* | (2019.01) | |

(52) U.S. Cl.
CPC ............... *B60L 53/63* (2019.02); *B60L 53/62* (2019.02); *B60L 53/66* (2019.02); *B60L 58/30* (2019.02); *B60L 58/40* (2019.02); *B60L 55/00* (2019.02)

(58) Field of Classification Search
CPC .......... B60L 53/63; B60L 53/62; B60L 53/66; B60L 58/30; B60L 58/40; B60L 55/00; B60L 2240/622; B60L 50/70; B60L 53/67; B60L 58/12; B60L 50/60; B60L 58/10; Y02T 90/16; H02J 3/00; H02J 3/008; H02J 3/322; H02J 3/38; H02J 3/381; H02J 3/46; H02J 2300/30
See application file for complete search history.

(56) References Cited

U.S. PATENT DOCUMENTS

| | | | | |
|---|---|---|---|---|
| 2002/0132144 A1* | 9/2002 | McArthur | .............. | G06Q 30/06 |
| | | | | 429/513 |
| 2006/0086406 A1* | 4/2006 | Sato | ...................... | G06Q 30/08 |
| | | | | 141/94 |

(Continued)

FOREIGN PATENT DOCUMENTS

| | | | |
|---|---|---|---|
| JP | 2007006574 A | * | 1/2007 |
| JP | 2020-017030 A | | 1/2020 |

*Primary Examiner* — Santosh R Poudel
(74) *Attorney, Agent, or Firm* — Finnegan, Henderson, Farabow, Garrett & Dunner, LLP.

(57) ABSTRACT

A server manages demand and supply of electric power between a power network and at least one vehicle which is electrically connected to the power network and available as a power adjustment resource of the power network. The at least one vehicle includes a FCEV. The server includes: an acquisition unit that obtains an operation plan of the FCEV and information on a remaining hydrogen level that is available for the FCEV; and a determination unit that determines whether the FCEV is available for a DR request, based on the operation plan and the remaining hydrogen level information.

7 Claims, 6 Drawing Sheets

(56) References Cited

U.S. PATENT DOCUMENTS

| | | | |
|---|---|---|---|
| 2006/0185756 A1* | 8/2006 | Sato | B60S 5/02 |
| | | | 141/94 |
| 2009/0091291 A1* | 4/2009 | Woody | H02J 3/14 |
| | | | 701/2 |
| 2020/0097909 A1* | 3/2020 | Todo | G06Q 50/26 |
| 2021/0021132 A1* | 1/2021 | Tsuji | H02J 3/381 |
| 2021/0122260 A1* | 4/2021 | Kazuno | H02J 7/00034 |

* cited by examiner

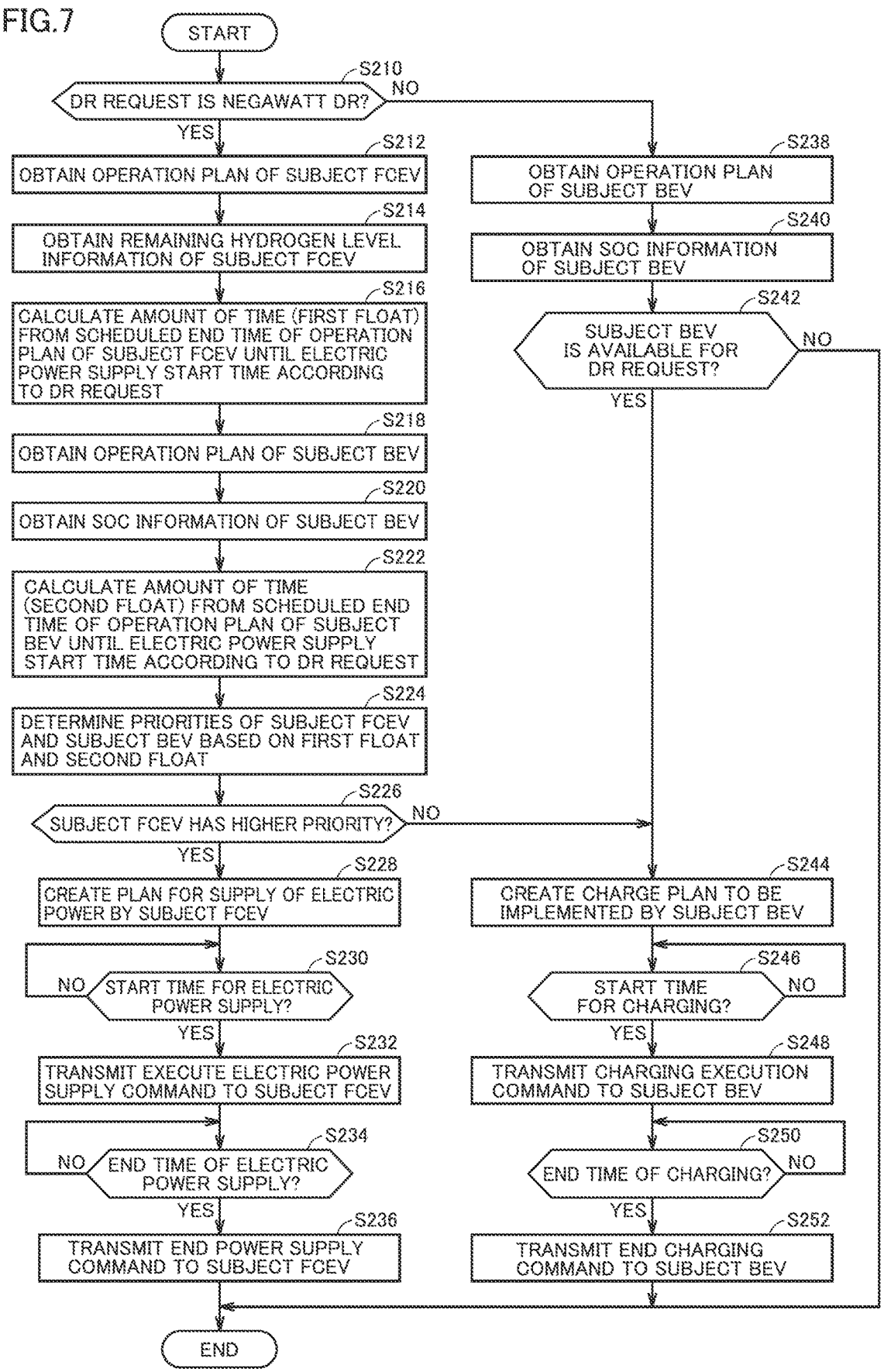

POWER MANAGEMENT APPARATUS AND POWER MANAGEMENT METHOD

This nonprovisional application is based on Japanese Patent Application No. 2020-212517 filed on Dec. 22, 2020 with the Japan Patent Office, the entire content of which is hereby incorporated by reference.

BACKGROUND

Field

The present disclosure relates to a power management apparatus and a power management method, and, in particular, to a power management apparatus and a power management method for managing the demand and supply of electric power between a power network and at least one vehicle that is electrically connected to the power network and available as a power adjustment resource for the power network.

Description of the Background Art

A demand response (referred to as a "DR" below) is known as a mechanism to request adjustment of supply and demand of electric power for a customer according to a request from the electric power company. For example, Japanese Patent Laying-Open No. 2020-17030 discloses a DR operating server which manages the demand and supply of electric power for each customer according to a DR request from the electric power company.

A fuel cell electric vehicle (referred to as an "FCEV" below) is drawing attention as an eco-friendly vehicle. FCEV runs using electric power generated by chemical reaction of hydrogen in the hydrogen tank and atmospheric oxygen. Since the fuel cell (FC) is a power generation device, FCEV, when not running, can be electrically connected to the power network and used as a power adjustment resource for the power network. There is a desire that, with an increase of such FCEVs, the FCEVs are leveraged as power adjustment resources that can participate in DR.

SUMMARY

The present disclosure is made in view of the problem above, and an object of the present disclosure is to provide a power management apparatus and a power management method which can effectively use a FCEV as a power adjustment resource in response to a DR request.

A power management apparatus according to the present disclosure manages demand and supply of electric power between a power network and at least one vehicle which is electrically connected to the power network and available as a power adjustment resource for the power network. The at least one vehicle includes a FCEV. The power management apparatus includes: an acquisition unit that obtains an operation plan of the FCEV, and information on a remaining hydrogen level available for the FCEV; and a determination unit that determines whether the FCEV is available for a DR request, based on the operation plan and the remaining hydrogen level information.

A power management method according to the present disclosure manages demand and supply of electric power between a power network and at least one vehicle which is electrically connected to the power network and available as a power adjustment resource for the power network. The at least one vehicle includes a FCEV. The power management method includes: obtaining an operation plan of the FCEV and information on a remaining hydrogen level available for the FCEV; and determining whether the FCEV is available for a DR request, based on the operation plan and the remaining hydrogen level information.

According to the power management apparatus and the power management method, it is determined whether the FCEV is available for a DR request, based on the operation plan and the remaining hydrogen level information of the FCEV. Thus, it can be determined with accuracy whether the FCEV is available for a DR request by predicting a state of the FCEV after the operation plan. Accordingly, for example, for the vehicle group of FCEVs whose operation plans are defined, an optimal DR plan for the vehicle group as a whole can be created based on the operation plans and the remaining hydrogen level information of the respective FCEVs.

If the DR request is a reduce demand request (negawatt DR) requesting a reduction in electric power demand (including supply of electric power to the power network), the determination unit may determine whether the FCEV is available for the DR request, based on the operation plan and the remaining hydrogen level information of the FCEV.

If the DR request is an increase demand request (posiwatt DR) requesting an increase in electric power demand, the determination unit may determine that the FCEV is unavailable for the DR request.

The FCEV is a power-generation-type power adjustment resource using a FC. Thus, the FCEV effectively works for a request for a reduction of the demand (including supply of electric power to the power network), while the FCEV is unfit for a request for an increase of the demand. According to the configuration above, the FCEV can appropriately and effectively be leveraged as a power adjustment resource, in response to a DR request.

The determination unit may determine whether the FCEV is available for the DR request, further based on a price of hydrogen available for the FCEV.

The price of hydrogen varies depending on, for example, a type of electric power used for the production of hydrogen. Thus, by incorporating the price of hydrogen in determination as to whether the FCEV is available for a DR request, it can be determined whether the FCEV is available for a DR request, taking the cost of hydrogen into account.

The remaining hydrogen level information indicates a remaining hydrogen level of the hydrogen tank mounted on the FCEV.

The remaining hydrogen level information may further include information on a hydrogen storage amount of a hydrogen station used by the FCEV.

By including the information on the hydrogen storage amount of a hydrogen station in the remaining hydrogen level information, the conditions of the infrastructure can also be considered when determining whether the FCEV is available for a DR request.

The at least one vehicle may further include a battery electric vehicle (referred to as a "BEV" below) available as the power adjustment resource, wherein the BEV and the FCEV are selectively electrically connected to the power network. When the DR request is the increase demand request, the acquisition unit may further obtain an operation plan of the BEV and SOC (State Of Charge) information of a power storage mounted on the BEV, and the determination unit may determine whether the BEV is available for the DR request, based on the operation plan of the BEV and the SOC information.

The BEV is a power-storage-type power adjustment resource, storing electric power in the power storage. Thus, the BEV effectively works for an increase demand request. According to the configuration above, it can be determined with accuracy whether the BEV is available for a DR request by predicting a state of the BEV after the operation plan in response to a DR request requesting an increase in electric power demand.

When the DR request is a reduce demand request, the acquisition unit may further obtain an operation plan of the BEV, and SOC information of the BEV, and the determination unit may: calculate a first float indicating an amount of time from a scheduled end time of the operation plan of the FCEV until an electric power supply start time according to the DR request; calculate a second float indicating an amount of time from a scheduled end time of the operation plan of the BEV until the electric power supply start time; and determine a priority of the FCEV and a priority of the BEV which are participating in the DR request, based on the first float and the second float. Here, a weight of the second float for the priority of the BEV is greater than a weight of the first float for the priority of the FCEV.

In general, the number of hydrogen stations for FCEV is less than the number of charging stations for BEV. Therefore, from the end of the operation plan until the start of supply of electric power, the risk of a FCEV being unable to be replenished with hydrogen at a hydrogen station is higher than the risk of a BEV being unable to charge the power storage at a charging station. According to the configuration above, the weight of the second float for the priority of the BEV is greater than the weight of the first float for the priority of the FCEV. Thus, for example, if the first float and the second float are the same, the BEV having a less risk has a higher priority than the FCEV. Accordingly, the response probability to a DR request can be increased.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart illustrating one example procedure of a DR process performed on a FCEV and a BEV, according to Embodiment 3.

DESCRIPTION OF THE PREFERRED EMBODIMENTS

Hereinafter, embodiments according to the present disclosure will be described, with reference to the accompanying drawings. Note that the same reference signs are used to refer to the same or like parts, and the description thereof will not be repeated.

Embodiment 1

Figure 1:
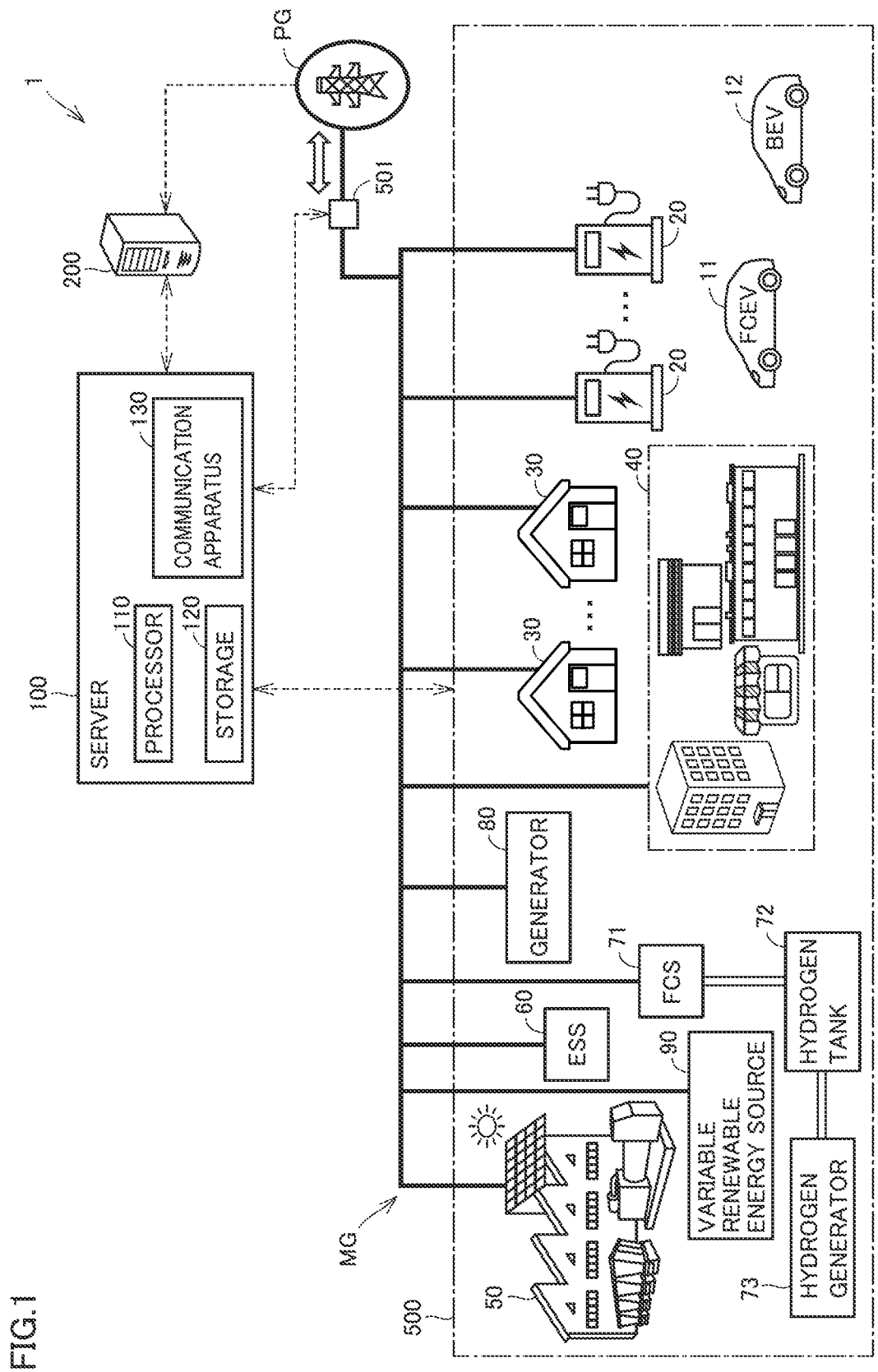
FIG. 1 is a diagram showing one example of an overall configuration of an electric power system to which a power management apparatus according to an embodiment of the present disclosure is applied.

Referring to FIG. 1, an overall configuration of an electric power system to which a power management apparatus according to an embodiment of the present disclosure is applied, is described. The electric power system 1 includes a power grid PG, a microgrid MG, servers 100, 200, a distributed energy resource (DER) group 500, and a power reception and transformation facility 501.

Microgrid MG is a power network which supplies electric power to the entirety of a city. A power line for networking DER group 500 in microgrid MG may be a private power line.

Power grid PG is a power network constructed by a power plant and a power transmission and distribution (T&D) facility that are not shown. In this embodiment, an electric power company serves as a power generation utility and a power T&D utility. The electric power company corresponds to a general power T&D utility and maintains and manages power grid PG (commercial power grid).

Power reception and transformation facility 501 is provided at a point of interconnection (a power reception point) of microgrid MG, receives alternating-current (AC) power from power grid PG, down-converts the received electric power, and supplies the down-converted electric power to microgrid MG. Power reception and transformation facility 501 includes a switch on a high voltage side (a primary side) (for example, a section switch, an isolator, a breaker, and a load break switch), a transformer, a protection relay, a measurement instrument, and a controller.

Server 100 is a power management apparatus which manages demand and supply of electric power between microgrid MG and DER group 500. Server 100 corresponds to, what is called, a community energy management system (EMS) (CEMS) server, and belongs to an administrator of microgrid MG. Server 200 is a computer that manages supply and demand of power grid PG. Server 200 belongs to the electric power company.

Server 100 is configured to communicate with each of server 200 and DER group 500. A protocol of communication may be OpenADR. Server 100 is configured to manage the plurality of DERs included in DER group 500. Server 100 may carry out a DR onto DER group 500 when it is requested by server 200 to adjust supply and demand of power grid PG. Server 100 may carry out DR on DER group 500 in response to a request from a supply and demand adjustment market, and may carry out DR onto DER group 500 in order to adjust the supply and demand of microgrid MG.

The plurality of DERs included in DER group 500 are electrically connected to microgrid MG. DER group 500 includes, for example, at least one FCEV 11, at least one BEV 12, a house 30, a commercial facility 40, a factory 50, an energy storage system (ESS) 60, a fuel cell system (FCS) 71, a generator 80, and a variable renewable energy source 90, each of which may function as a DER.

As FCEV 11 and BEV 12 are electrically connected to an electric vehicle supply equipment (EVSE) 20 connected to microgrid MG, FCEV 11 and BEV 12 function as DERs. For example, FCEV 11 or BEV 12 is electrically connected to microgrid MG via EVSE 20 by a connector provided on an electric power cable of EVSE 20 being connected to the inlet of FCEV 11 or BEV 12.

While only one FCEV 11 and one BEV 12 are shown in FIG. 1, it should be noted that DER group 500 may include any number of FCEVs 11 and any number of BEVs 12. FCEV 11 and BEV 12 each may be a Mobility as a Service (MaaS) vehicle or a personally owned vehicle (POV). The MaaS vehicle is a vehicle managed by a MaaS entity. FCEV 11 and BEV 12 may be connected to any number of EVSEs 20, and DER group 500 may include any number of houses 30, commercial facilities 40, factories 50, ESSs 60, FCSs 71, generators 80, and variable renewable energy sources 90.

EVSE 20 is a public electric-power interface equipment that can be used by a user of a vehicle after prescribed authentication. EVSE 20 converts electric power, output from FCEV 11 or BEV 12 connected to EVSE 20, into alternating-current power (grid power), and outputs the alternating-current power to microgrid MG. EVSE 20 also converts alternating-current power, received from microgrid MG, into direct-current power, and outputs the direct-current power to BEV 12 connected to EVSE 20. An AC to DC power converter may be included in FCEV 11 or BEV 12. EVSE 20 is also configured to communicate with server 100. Server 100 can identify a user who uses EVSE 20 through the authentication above.

House 30 includes various home electrical appliances (for example, a lighting device, an air-conditioning facility, kitchen equipment, information equipment, a television, a refrigerator, and a washing machine). House 30 may include at least one of a charger-discharger (for example, home EVSE), a variable renewable energy source (for example, a photovoltaic panel provided on a roof), an ESS, an FCS, and a cogeneration system (for example, a water heater or a heat pump water heater that uses heat generated in self-generation). If house 30 includes a home EVSE, as FCEV 11 and BEV 12 are electrically connected to the home EVSE of house 30, FCEV 11 and BEV 12 may function as DERs.

Supply and demand of energy in house 30 is managed, for example, by a not-shown home EMS (Home EMS). House 30 is configured to communicate with server 100. In the present embodiment, house 30 communicates with server 100 through the HEMS.

Commercial facility 40 includes, for example, office buildings and stores. Examples of the stores include department stores, shopping centers, supermarkets, or convenience stores. Supply and demand of energy in each facility included in commercial facility 40 is managed, for example, by a not shown building EMS (BEMS). The BEMS may manage supply and demand of energy individually for each facility or may collectively manage supply and demand of energy in a plurality of facilities. Commercial facility 40 is configured to communicate with server 100. In the present embodiment, commercial facility 40 communicates with server 100 through the BEMS.

Factory 50 may be, for example, a car factory or another factory. Factory 50 includes, for example, a production line and a concentrated heat source for air-conditioning. Factory 50 may include at least one of a variable renewable energy source (for example, a photovoltaic power generation facility or a wind power generation facility), a generator (for example, a gas turbine generator or a diesel generator), and a cogeneration system. Supply and demand of energy in factory 50 is managed, for example, by a not-shown factory EMS (FEMS). Factory 50 is configured to communicate with server 100. In the present embodiment, factory 50 communicates with server 100 through the FEMS.

ESS 60 is a stationary power storage configured to be chargeable from and dischargeable to microgrid MG. For example, a lithium ion battery, a lead-acid battery, a nickel metal hydride battery, a redox flow battery, or a sodium sulfur (NAS) battery may be adopted as ESS 60. Surplus electric power generated by variable renewable energy source 90 may be stored in ESS 60.

FCS 71 includes a fuel cell that generates electric power by chemical reaction between hydrogen and oxygen. FCS 71 is connected to a hydrogen tank 72 that is connected to a hydrogen generator 73. FCS 71 is configured to generate electric power by using hydrogen supplied from hydrogen tank 72 and to supply generated electric power to microgrid MG. Hydrogen generator 73 generates hydrogen and supplies generated hydrogen to hydrogen tank 72.

Hydrogen generator 73 may generate hydrogen by using electric power supplied from microgrid MG or by using surplus electric power generated by variable renewable energy source 90. Server 100 may control hydrogen generator 73 such that a remaining hydrogen level in hydrogen tank 72 is not smaller than a prescribed value. Note that any method can be adopted as a hydrogen generation method. For example, such a known method as a by-product hydrogen method, water electrolysis, a fossil fuel reforming method, a biomass reforming method, or an iodine-sulfur (IS) process can be adopted.

Generator 80 is a stationary generator that generates electric power by using fossil fuel. Generator 80 may be, for example, a gas turbine generator or a diesel generator. Generator 80 may be used as an emergency power supply.

Variable renewable energy source 90 is a power supply that varies in generated output power depending on a weather condition and provides generated electric power to microgrid MG. Electric power generated by variable renewable energy source 90 corresponds to variable renewable energy (VRE). Variable renewable energy source 90 includes, for example, a photovoltaic power generation facility and a wind power generation facility.

Server 100 includes a processor 110, a storage 120, and a communication apparatus 130. Processor 110 may be implemented by a central processing unit (CPU). Storage 120 is configured to store various types of information. Storage 120 stores not only a program executed by processor 110 but also information (for example, a map, a mathematical expression, various parameters, etc.) to be used by a program. Communication apparatus 130 includes various communication interfaces (I/Fs). Server 100 is configured to communicate with the outside through communication apparatus 130.

Server 100 controls DER group 500, connected to microgrid MG, to cause DER group 500 to function as a virtual power plant (VPP). Specifically, server 100 remotely controls DER group 500 as being integrated as if the DERs functioned as a single power plant according to an energy management technology that makes use of IoT. Each DER included in DER group 500 functions as a power adjustment resource for the power network.

In Embodiment 1, server 100 carries out DR to DER group 500. Schematically, if requested to adjust supply and demand, for example, from server 200, server 100 determines the power capacity that the DER group 500 can offer. Based on the capacity, server 100 then generates a DR plan for DER group 500 as a whole, and transmits a DR request to each DER participating in DR.

As noted above, DER group 500 includes FCEV 11 and BEV 12. FCEVs and BEVs are drawing attention as eco-friendly vehicles. There is a desire that recently increasing FCEVs and BEVs are effectively leveraged as power adjustment resources for DR.

In Embodiment 1, an approach is shown in which FCEV 11 is effectively leveraged as a power adjustment resource for DR. Specifically, server 100 obtains the operation plan of FCEV 11 and information on a remaining hydrogen level that is available for FCEV 11, and, based on the obtained operation plan and remaining hydrogen level information, determines whether FCEV 11 is available for a DR request.

With this, it can be determined with accuracy whether FCEV 11 is available for a DR request by predicting a state of FCEV 11 after the operation plan. Accordingly, for example, for a vehicle group of FCEVs 11 (for example, a plurality of FC buses, etc.) whose operation plans are defined, an optimal DR plan for the vehicle group as a whole can be created based on the operation plans and remaining hydrogen level information of the respective FCEVs 11.

Figure 2:
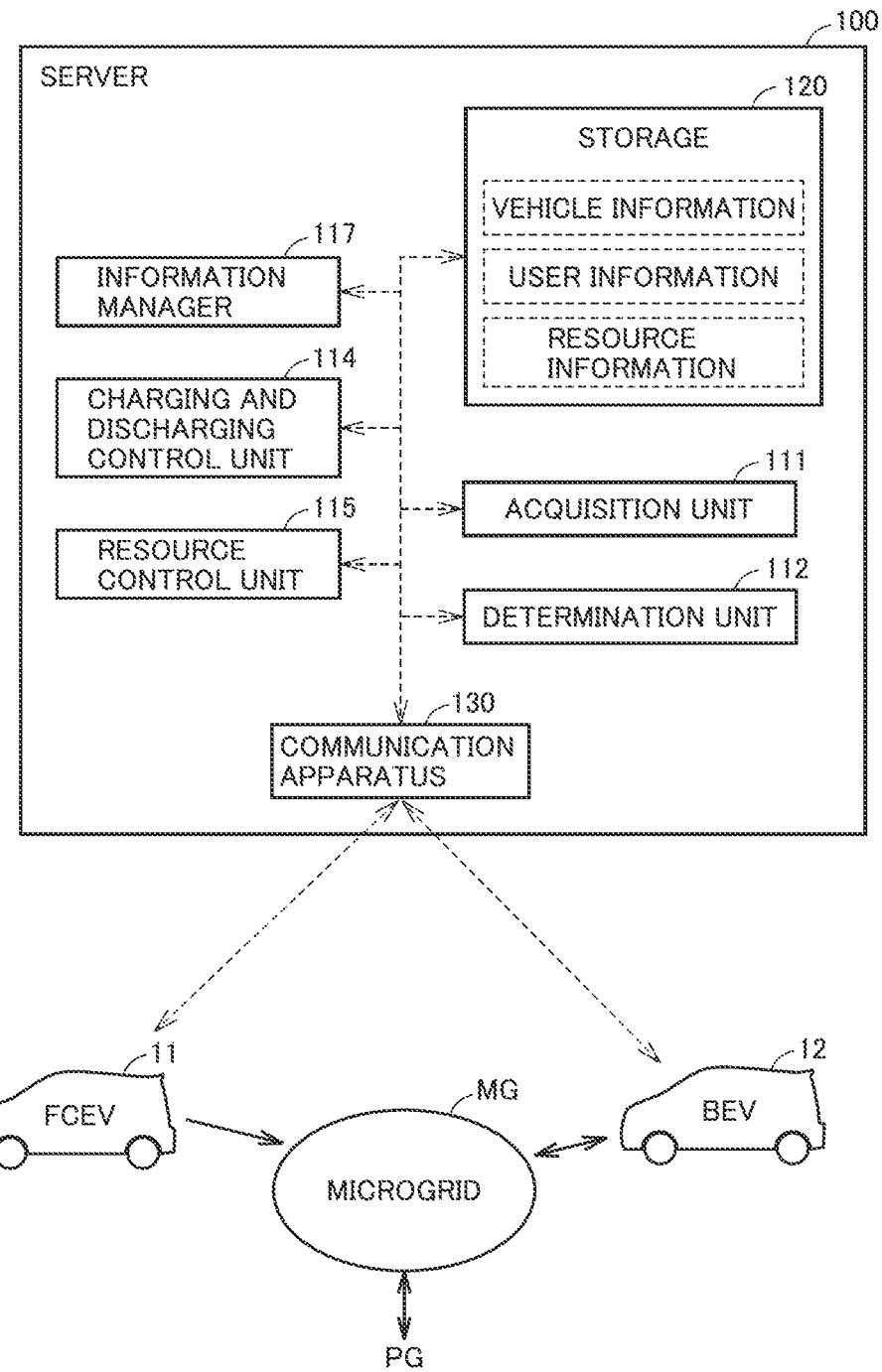
FIG. 2 is a diagram showing a configuration example of a server 100 of FIG. 1.

Referring to FIGS. 1 and 2, a configuration of server 100 is now described. Server 100 includes an acquisition unit 111, a determination unit 112, a charging and discharging control unit 114, a resource control unit 115, an information manager 117, a storage 120, and a communication apparatus 130. Each unit is implemented, for example, by processor 110 shown in FIG. 1 and a program in storage 120 executed by processor 110. Without being limited as such, each unit may be implemented by dedicated hardware (electronic circuitry).

Server 100 is configured to communicate, through communication apparatus 130, with each DER, including FCEV 11 and BEV 12 (DERs, other than FCEV 11 and BEV 12, are not shown).

Information manager 117 is configured to manage information on each user (which is also referred to as "user information" below) registered in server 100, information (which is referred to as "vehicle information" below) on each vehicle (FCEV 11 or BEV 12) registered in server 100, and information on each stationary DER (which is referred to as "resource information" below) registered in server 100. The user information, the vehicle information, and the resource information are stored in storage 120 as being distinguished for each user, for each vehicle, or for each DER based on identification information (ID).

As FCEV 11, registered in server 100, is connected to EVSE 20, FCEV 11 can supply microgrid MG with electric power that is generated by the FC system mounted on FCEV 11, according to a DR request from server 100. As BEV 12, registered in server 100, is connected to EVSE 20, BEV 12 can charge the vehicle battery with the electric power supplied from microgrid MG according to a DR request from server 100, and supply the electric power stored in the battery to microgrid MG.

The vehicle information includes vehicle specs, a position of the vehicle, a remaining energy level of the vehicle, and the operation plan of the vehicle. For example, the vehicle specs for FCEV 11 includes the capacity of the hydrogen tank and electric power that FCEV 11 can supply, and the vehicle specs for BEV 12 includes the capacity of the battery and electric power that can be charged to and discharged from the battery, etc. The remaining energy level for FCEV 11 is, for example, a remaining hydrogen level of the hydrogen tank, and the remaining energy level for BEV 12 is SOC of the battery. The location and remaining energy level of each vehicle are detected by various sensors mounted on the vehicle, and transmitted from the vehicle to server 100. Acquisition unit 111 obtains the location and remaining energy level of each vehicle from the vehicle through communication apparatus 130, and stores the location and remaining energy level of each vehicle into storage 120 as vehicle information associated with the identification information (ID) for each vehicle.

The operation plan defines the route service and operation hours of each of the vehicles (FCEV 11, BEV 12). During the operation hours, the vehicle is away from EVSE 20, and operated according to the operation plan. Accordingly, the vehicle is unable to function as a DER during the operation hours. The vehicle is able to function as a DER once connected to EVSE 20 outside the operation plan. In Embodiment 1, the vehicle is, for example, a local bus or a shared taxi, and the operation plan is scheduled in advance for each vehicle. The operation plan is obtained by acquisition unit 111 from an external operation management server (not shown) through communication apparatus 130, for example.

EVSE 20, house 30, commercial facility 40, factory 50, ESS 60, FCS 71, generator 80, and variable renewable energy source 90 are registered in server 100 as stationary DERs. The resource information includes a state, and specs (for example, maximum output power, a capacity, responsiveness, etc.) of each stationary DER. The state of EVSE 20 includes whether or not a vehicle is connected thereto. The state of EVSE 20 to which FCEV 11 is connected includes a state (for example, an active or inactive state of ECU, supply power, etc.) of that FCEV 11. The state of EVSE 20 to which BEV 12 is connected includes a state (for example, an active or inactive state of ECU, charging power/supply power, etc.) of that BEV 12.

The state of each of house 30, commercial facility 40, and factory 50 includes consumed power. The state of ESS 60 includes an active or inactive state of a control system, an SOC, and charging and discharging power. The state of each of FCS 71 and generator 80 includes an active or inactive state of the control system, generated electric power, and reserve generation capacity. The state of FCS 71 further includes a remaining hydrogen level in hydrogen tank 72. The state of variable renewable energy source 90 includes generated electric power. These resource information are obtained by acquisition unit 111 through communication apparatus 130, and stored in storage 120.

The user information includes a communication address of portable terminal carried by the user, a vehicle ID of a vehicle belonging to the user, a resource ID of the stationary DER belonging to the user, an electricity fee (including a charge fee), and incentive information (for example, an amount of acquired incentive).

Each user registered in server 100 has signed a contract for using electric power of microgrid MG with an administrator of microgrid MG (which is referred to as an "MG administrator" below). Under this contract, a user (demand side) who uses electric power supplied from microgrid MG is obliged to pay a prescribed electricity fee to the MG administrator.

A DER user who has made power adjustment of microgrid MG in response to a DR request from the MG administrator obtains the right to receive an incentive determined in advance in the contract from the MG administrator. Information manager 117 manages the incentive to be given to the DER user who has made power adjustment of microgrid MG. The incentive may be paid with a general currency or a virtual currency that can be used only in the city.

Information manager 117 calculates the amount of acquired incentive for each user based on a prescribed incentive unit price. Any incentive unit price is determined in the contract. The incentive unit price may be a unit price for the number of times of electric power adjustment, a unit price for an amount of made power adjustment, or a unit price for a time period of electric power adjustment.

Determination unit 112 determines whether FCEV 11 participating in DR and connected to EVSE 20 is available for a DR request. Specifically, if the DR request is a reduce demand request (may also be referred to as a "negawatt DR," and a DR requesting reduction in electric power demand will be referred to as a "negawatt DR" below) requesting a reduction in electric power demand, determination unit 112 determines whether FCEV 11 is available for a negawatt DR, based on the operation plan and remaining hydrogen level of FCEV 11 stored in storage 120. Note that the negawatt DR is not limited to the reduction in electric power demand, and includes supply of electric power to the power network. In other words, FCEV 11 is determined to be available for a negawatt DR if FCEV 11 is able to supply electric power to the power network through EVSE 20.

Determination unit 112 determines that FCEV 11 is unavailable for a DR request if, for example, a period of time for which the negawatt DR is scheduled overlaps with the operation hours of FCEV 11. Alternatively, FCEV 11 is determined to be unavailable for a DR request if the remaining hydrogen level of FCEV 11 is lower than a prescribed threshold. Note that remaining hydrogen level may include not only the remaining hydrogen level of the hydrogen tank of FCEV 11, but also the remaining hydrogen level of a hydrogen station (for example, a hydrogen station in a geographical region in which FCEV 11 is operated) used by FCEV 11. Even if the remaining hydrogen level of the hydrogen tank of FCEV 11 is low, FCEV 11 is available for a DR request if the hydrogen station can be filled with hydrogen in time for the DR. On the other hand, if the hydrogen tank of FCEV 11 and the remaining hydrogen level of the hydrogen station are both low, the hydrogen station cannot be filled with hydrogen, and thus is unavailable for a DR request. Note that the information on the remaining hydrogen level of the hydrogen station used by FCEV 11 is obtained by acquisition unit 111 from the hydrogen station.

If the DR request is an increase demand request (may also be referred to as a "posiwatt DR," and a DR requesting an increase in electric power demand will be referred to as a "posiwatt DR" below) requesting an increase in electric power demand, determination unit 112 determines that FCEV 11 is unavailable for the DR request. Since FCEV 11 is a power-generation-type power adjustment resource using a FC, FCEV 11 effectively works for negawatt DR, while it is unfit for posiwatt DR. Thus, in Embodiment 1, FCEV 11 is determined as being unavailable for the DR request as the above.

Charging and discharging control unit 114 creates a power supply schedule for FCEV 11 connected to EVSE 20, according to a DR request, and outputs to FCEV 11 a start electric power supply command/an end electric power supply command and a command regarding a magnitude of supply power, according to the power supply schedule. Charging and discharging control unit 114 also creates a charging and discharging schedule for BEV 12 connected to EVSE 20, according to the DR request, and outputs to BEV 12 a start charging and discharging command/an end charging discharging command, and commands regarding the magnitudes of charging power and discharging power, according to the charging and discharging schedule.

In response to a DR request, resource control unit 115 selects a DER according to a prescribed priority. Prior to the selection of DER, resource control unit 115 may exclude DERs not suited for adjustment of electric power from candidates for selection. For example, resource control unit 115 may exclude DERs that do not enter a standby state within a period of a DR request. The user of a DER having made power adjustment receives an incentive from the MG administrator.

Figure 3:
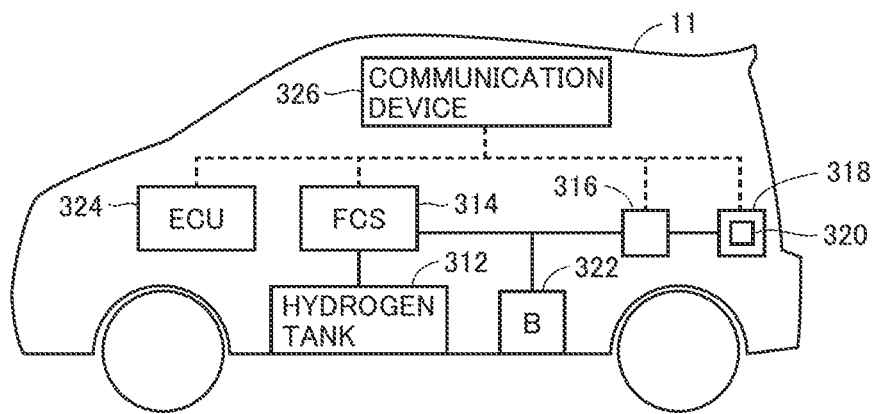
FIG. 3 is a diagram showing a configuration example of a FCEV.

Referring to FIG. 3, a configuration of FCEV 11 is now described. FCEV 11 includes a hydrogen tank 312, a FC system (FCS) 314, a relay 316, an electric power supply port 318, an inlet 320, a battery 322, an electronic control unit (ECU) 324, and a communication device 326.

Hydrogen tank 312 stores hydrogen to be supplied to FC system 314. Hydrogen tank 312 is, for example, a light-weight high-pressure tank having a high strength which includes a carbon-fiber-reinforced plastic layer, and capable of storing hydrogen of several tens of MPa, for example.

FC system 314 includes a FC stack and a converter (none of which are shown). FC system 314 generates power at the FC stack through electrochemical reaction of hydrogen supplied from hydrogen tank 312 and oxygen (air) taken in from the outside, and outputs direct-current power obtained by up-converting the power by the converter.

For the supply of electric power from FCEV 11 to microgrid MG through EVSE 20, ECU 324 controls relay 316 to be in a conductive state. Electric power supply port 318 has an inlet 320. As a connector (not shown) provided on the electric power cable of EVSE 20 is connected to inlet 320, FCEV 11 is electrically connected to EVSE 20, which allows the supply of electric power from FCEV 11 to microgrid MG through EVSE 20.

Battery 322 is connected to a power line between FC system 314 and relay 316, and capable of storing electric power generated by FC system 314, and the regenerative power generated by a travel motor (not shown) at the time of breaking of the vehicle.

ECU 324 includes a processor (CPU, etc.), a memory (read only memory (ROM) and a random access memory (RAM)), an I/O buffer, etc. (none of which are shown). The processor deploys programs stored in the ROM into the RAM, etc., and executes the programs. Various control processes performed by ECU 324 are described in the programs stored in the ROM.

Communication device 326 includes various communication I/Fs. ECU 324 can communicate with server 100 through communication device 326. Communication device 326 may include a data communication module (DCM), or a 5G (Fifth generation wireless communications) enabled communication I/F.

ECU 324 obtains a remaining hydrogen level of hydrogen tank 312 by a sensor not shown, and transmits the remaining hydrogen level to server 100 through communication device 326. ECU 324 also obtains the location information of FCEV 11, using a GPS not shown, and transmits the location information of FCEV 11 to server 100 through communication device 326. The remaining hydrogen level and the location information are periodically transmitted to server 100, for example, at prescribed cycles.

Upon receiving a start electric power supply command from server 100 through communication device 326 while the connector of EVSE 20 is being connected to inlet 320, ECU 324 brings relay 316 into the conductive state and actuates FC system 314. This causes the electric power generated by FC system 314 to be output to EVSE 20. Upon receiving a stop electric power supply command through communication device 326, ECU 324 stops the operation of FC system 314 and brings relay 316 into a blocking state.

Figure 4:
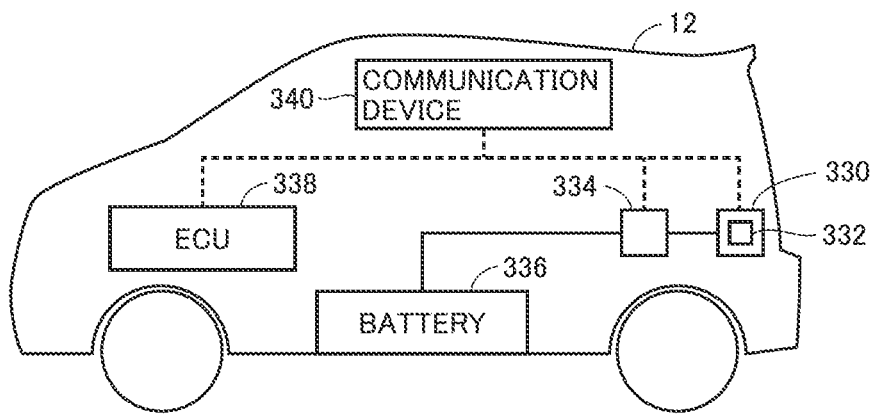
FIG. 4 is a diagram showing a configuration example of a BEV.

Referring to FIG. 4, a configuration of BEV 12 is now described. BEV 12 includes a charging port 330, an inlet 332, a relay 334, a battery 336, an ECU 338, and a communication device 340.

Charging port 330 has inlet 332. As a connector (not shown) provided on the electric power cable of EVSE 20 is connected to inlet 332, BEV 12 is electrically connected to EVSE 20, which allows, for example, battery 336 to be charged by EVSE 20, and the electric power stored in battery 336 to be supplied to microgrid MG through EVSE 20.

Relay 334 is controlled to be in the conductive state by ECU 338 when EVSE 20 charges BEV 12 or when electric power is supplied from BEV 12 to EVSE 20. Battery 336 is charged by EVSE 20 electrically connected to inlet 332. The electric power stored in battery 336 can be output to EVSE 20 electrically connected to inlet 332. Battery 336 can also store the regenerative power generated by a travel motor (not shown) at the time of breaking of the vehicle.

ECU 338 includes a processor (CPU, etc.), a memory (ROM and RAM), an I/O buffer, etc. (none of which are shown). The processor deploys programs stored in the ROM into the RAM, etc., and executes the programs. Various control processes performed by ECU 338 are described in the programs stored in the ROM.

Communication device 340 includes various communication I/Fs. ECU 338 can communicate with server 100 through communication device 340. Communication device 340 may include a DCM or 5G enabled communication I/F.

ECU 338 calculates the SOC of battery 336 from, for example, the voltage and the current of battery 336 which are obtained by sensors not shown, and transmits the SOC of battery 336 to server 100 through communication device 340. ECU 338 also obtains the location information of BEV 12 using a GPS not shown, and transmits the location information of BEV 12 to server 100 through communication device 340. The SOC and the location information are periodically transmitted to server 100, for example, at prescribed cycles.

Upon receiving a start charging command or a start electric power supply command from server 100 through communication device 340 while the connector of EVSE 20 is being connected to inlet 332, ECU 338 brings relay 334 into the conductive state. This causes battery 336 to be charged by EVSE 20 if ECU 338 receives a start charging command and causes the electric power stored in battery 336 to be output to EVSE 20 if ECU 338 receives the start electric power supply command. Upon receiving a stop charging command or a stop electric power supply command through communication device 340, ECU 338 brings relay 334 into a blocking state.

Figure 5:
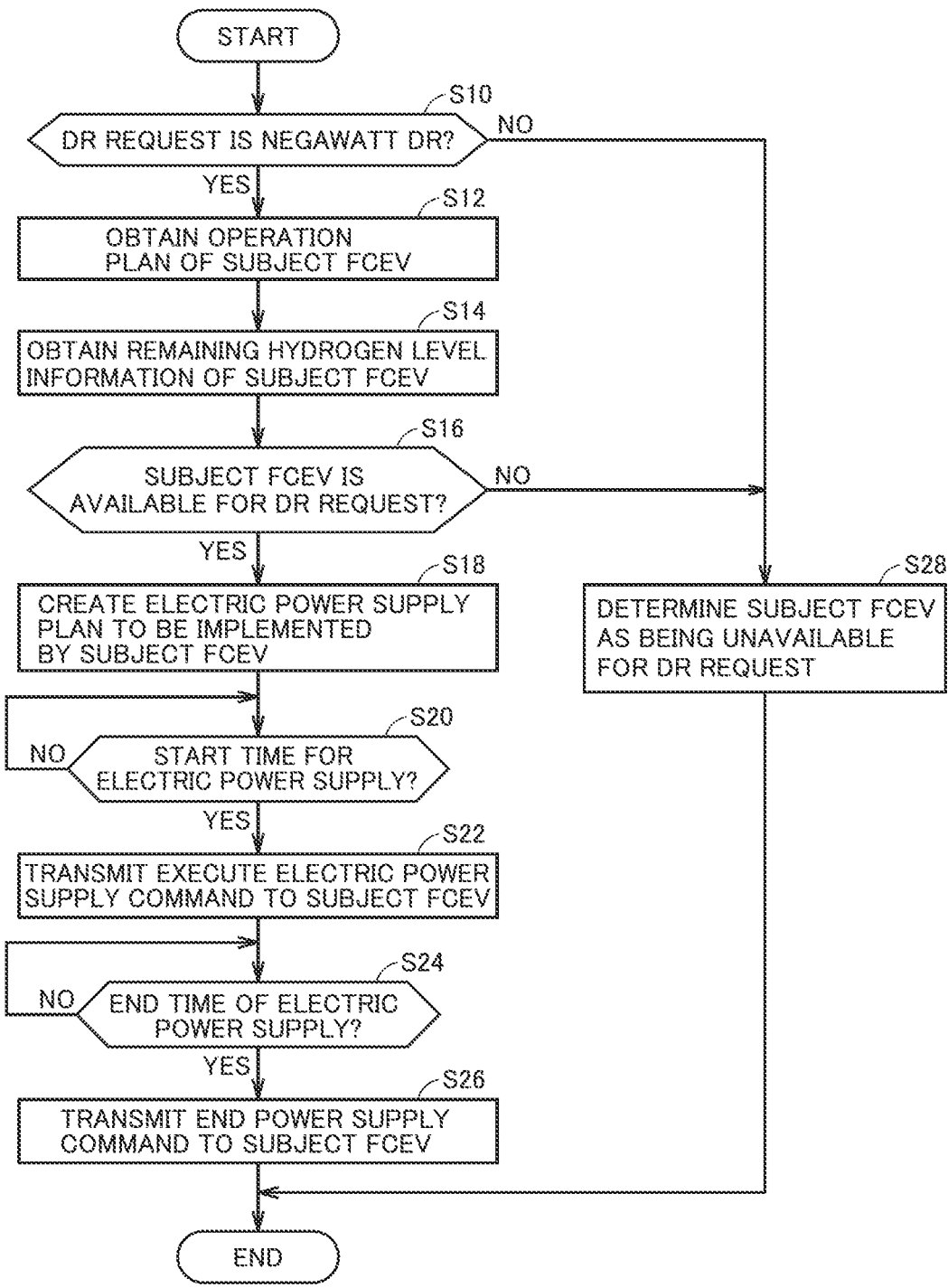
FIG. 5 is a flowchart illustrating one example procedure of a DR process performed on a FCEV.

Next, referring to FIG. 5, a procedure of a DR process performed on FCEV 11 by server 100 is described. The process illustrated in the flowchart is performed on FCEV 11 participating in DR. FCEV 11 on which the processed is performed will be referred to as a "subject FCEV" below.

Initially, server 100 determines whether a DR request to DER group 500 is a negawatt DR (step S10). If the DR request is not a negawatt DR, that is, the DR request is a posiwatt DR (NO in step S10), server 100 determines that the subject FCEV is unavailable for the DR request (step S28). The process is then ended.

If the DR request to DER group 500 is determined to be a negawatt DR in step S10 (YES in step S10), server 100 obtains the operation plan of the subject FCEV (step S12). The operation plan of the subject FCEV is obtained from, for example, an external operation management server managing the operations of FCEV 11 and BEV 12.

Server 100 further obtains a remaining hydrogen level information of the subject FCEV (step S14). The remaining hydrogen level information includes a remaining hydrogen level of hydrogen tank 312 of the subject FCEV, which is obtained from the subject FCEV. If the remaining hydrogen level information includes the remaining hydrogen level of a hydrogen station used by the subject FCEV, remaining hydrogen level information is also obtained from the hydrogen station.

Then, based on the operation plan and remaining hydrogen level information of the subject FCEV, server 100 determines whether the subject FCEV is available for the DR request (negawatt DR) (step S16). For example, a period of time for the DR request and the operation hours of the subject FCEV overlap, the subject FCEV is determined to be unavailable for the DR request. Alternatively, the subject FCEV is determined to be unavailable for the DR request if the remaining hydrogen level is lower than a prescribed threshold, for example.

If the subject FCEV is determined to be unavailable for the DR request in step S16 (NO in step S16), the process is passed to step S28. On the other hand, if the subject FCEV is determined to be available for the DR request (negawatt DR) in step S16 (YES in step S16), server 100 creates an electric power supply plan to be implemented by the subject FCEV, based on the DR request (step S18). The electric power supply plan includes the start time and end time of electric power supply implemented by the subject FCEV, the magnitude of the electric power supplied, etc.

Upon creation of the electric power supply plan, server 100 transmits the electric power supply plan to the subject FCEV. Upon arrival of the start time of electric power supply by the subject FCEV (YES in step S20), server 100 transmits an execute electric power supply command to the subject FCEV (step S22). Subsequently, upon arrival of an end time of the electric power supply by the subject FCEV thereafter (YES in step S24), server 100 transmits an end power supply command to the subject FCEV (step S26).

While it is determined whether the subject FCEV is available for a DR request based on the operation plan and remaining hydrogen level information of the subject FCEV in the above, it should be noted that further information may be taken into account. For example, information on the price of hydrogen available for the subject FCEV may be obtained and considered when determining whether the subject FCEV is available for a DR request (negawatt DR). The price of hydrogen in the hydrogen station varies depending on, for example, a type of electric power used for the production of hydrogen. Thus, by incorporating the price of hydrogen in determination as to whether the subject FCEV is available for a DR request, the cost of hydrogen can also be considered when determining whether the subject FCEV is available for a DR request.

As described above, according to Embodiment 1, since it is determined whether FCEV 11 is available for a DR request (negawatt DR), based on the operation plan and the remaining hydrogen level information of FCEV 11, it can be determined with accuracy whether FCEV 11 is available for a DR request by predicting a state of FCEV 11 after the operation plan. Accordingly, for example, for a vehicle group of FCEVs whose operation plans are defined, an optimal DR plan for the vehicle group as a whole can be created based on the operation plans and remaining hydrogen level information of the respective FCEVs 11.

In Embodiment 1, FCEV 11 is determined to be unavailable for a DR request if the DR request is a posiwatt DR. Since FCEV 11 is a power-generation-type power adjustment resource using a FC, FCEV 11 effectively works for negawatt DR (including the supply of electric power to the power network), while it is unfit for posiwatt DR. According to Embodiment 1, with the configuration above, FCEV 11 can appropriately and effectively be leveraged as a power adjustment resource, in response to a DR request.

The price of hydrogen varies depending on, for example, a type of electric power used for the production of hydrogen. Thus, as described above, by incorporating the price of hydrogen in determination as to whether the FCEV 11 is available for a DR request, the cost of hydrogen can be considered when determining whether the FCEV 11 is available for a DR request.

Moreover, by including the information on the hydrogen storage amount of a hydrogen station used by FCEV 11 in the remaining hydrogen level information of FCEV 11, the conditions of the infrastructure can also be considered when determining whether FCEV 11 is available for a DR request.

Embodiment 2

A FCEV 11, which is a power-generation-type power adjustment resources, is unfit for posiwatt DR (an increase demand request), and, in Embodiment 1, FCEV 11 is determined to be unavailable for a DR request if the DR request is a posiwatt DR. On the other hand, a BEV 12 is a power-storage-type power adjustment resource, and can effectively work for posiwatt DR. Thus, in Embodiment 2, if a user owns a FCEV 11 and a BEV 12 (for example, if a bus or taxi operating company owns FCEV 11 and BEV 12) and a DR request is a posiwatt DR, it is determined whether BEV 12 is available for a DR request. This enables a server 100 to respond to a DR request even if the DR request is a posiwatt DR.

The overall configuration of electric power system and the configuration of server 100 according to Embodiment 2 are the same as those according to Embodiment 1 shown in FIGS. 1, 2.

Figure 6:
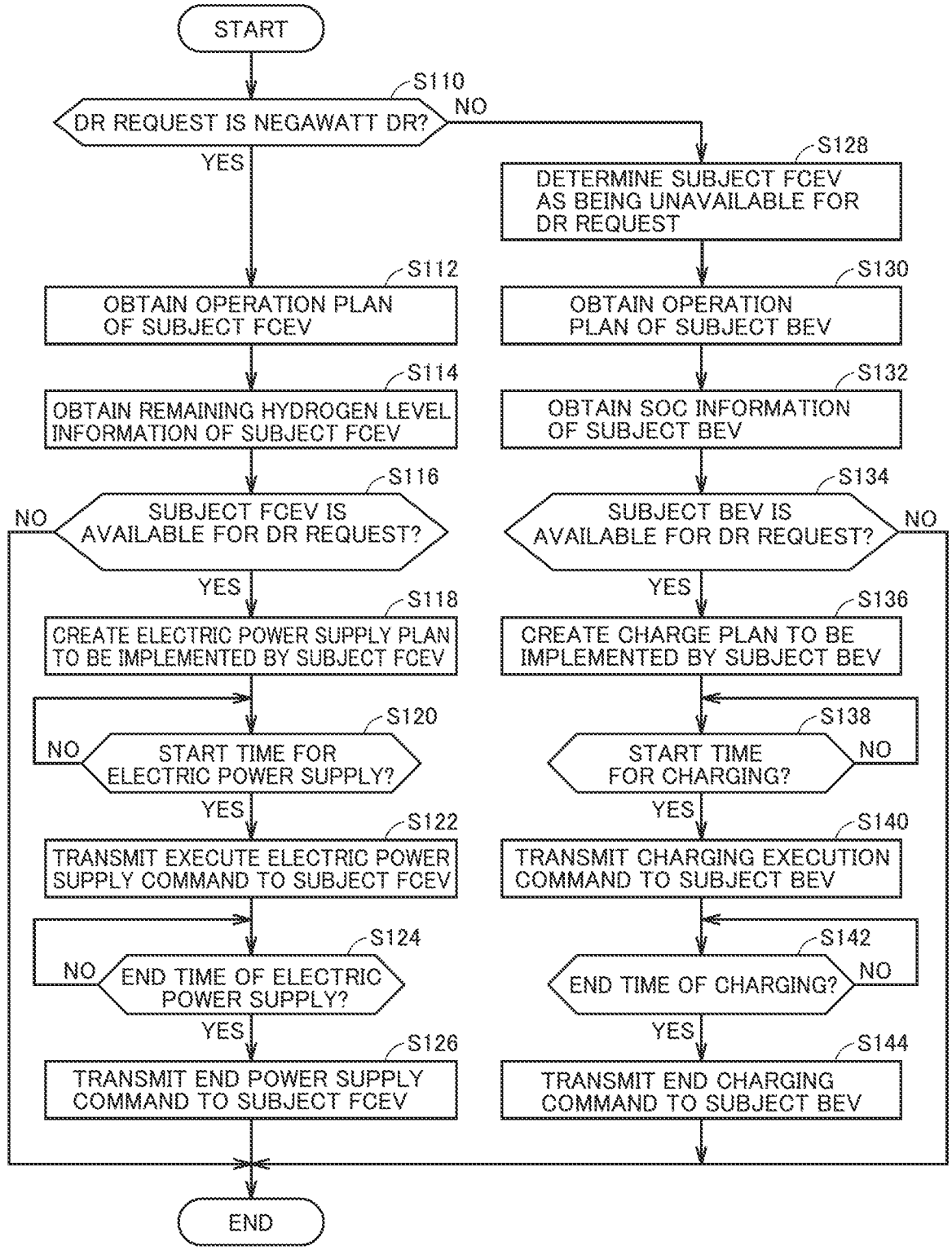
FIG. 6 is a flowchart showing one example procedure of a DR process performed on a FCEV and a BEV, according to Embodiment 2.

Referring to FIG. 6, a procedure of a DR process performed on FCEV 11 and BEV 12 according to Embodiment 2 is now described. The process illustrated in the flowchart is performed on FCEV 11 and BEV 12 participating in DR. BEV 12 on which the processed is performed will be referred to as a "subject BEV" below.

The process steps from step S110 to step S128 are the same as the process steps from step S10 to step S28, respectively, of the flowchart according to Embodiment 1 illustrated in FIG. 5.

In the flowchart, if the DR request is determined to be a posiwatt DR in step S110 (NO in step S110) and the subject FCEV is determined to be unavailable for the DR request (step S128), server 100 obtains the operation plan of the subject BEV (step S130). The operation plan of the subject BEV is obtained from, for example, an external operation management server managing the operations of FCEV 11 and BEV P.

Server 100 further obtains SOC information of the subject BEV (step S132) The SOC information is obtained from the subject BEV. Then, based on the obtained operation plan and SOC information of the subject BEV, server 100 determines whether the subject BEV is available for the DR request (posiwatt DR) (step S134). For example, if a period of time for the DR request and the operation hours of the subject BEV overlap, the subject BEV is determined to be unavailable for the DR request. Alternatively, the subject BEV is determined to be unavailable for the DR request if the SOC is lower than a prescribed threshold, for example.

If the subject BEV is determined to be unavailable for the DR request in step S134 (NO in step S134), the process is ended, without performing a series of subsequent process steps.

On the other hand, if the subject BEV is determined to be available for the DR request in step S134 (YES in step S134), server 100 creates a charge plan to be implemented by the subject BEV, based on the DR request (step S136). The charge plan includes the start time and end time of charging by the subject BEV, the magnitude of charging power, etc.

Upon creation of the charge plan, server 100 transmits the charge plan to the subject BEV. Upon arrival of the start time for charging by the subject BEV (YES in step S138), server 100 transmits a charging execution command to the subject BEV (step S140). Subsequently, upon arrival of the end time of the charging by the subject BEV thereafter (YES in step S142), server 100 transmits an end charging command to the subject BEV (step S144).

As described above, according to Embodiment 2, while FCEV 11, which is a power-generation-type power adjustment resource, is unavailable for a DR request if the DR request is a posiwatt DR, it is also determined whether BEV 12, which is a power-storage-type power adjustment resource, is available for the DR request. This enables server 100 to respond to a DR request even if the DR request is a posiwatt DR.

Embodiment 3

A BEV 12 can also supply electric power to a microgrid MG through an EVSE 20. Thus, BEV 12 can effectively work for a negawatt DR if the SOC of a battery 336 is high to some extent. Due to this, FCEV 11 and BEV 12 can conflict with each other when a DR request is a negawatt DR.

FCEV 11, which is a power-generation-type power adjustment resource, has a higher capacity for supplying the electric power than BEV 12, which is a power-storage-type power adjustment resource. Thus, typically, it is contemplated that FCEV 11 has a higher priority than BEV 12 when FCEV 11 and BEV 12 conflict when a DR request is a negawatt DR. However, in general, the number of hydrogen stations for FCEV is less than the number of charging stations for BEV. Therefore, from the end of the operation plan until the start of supply of electric power, the risk of FCEV 11 being unable to replenish hydrogen tank 312 with hydrogen at a hydrogen station is higher than the risk of BEV 12 being unable to charge battery 336 at a charging station.

Thus, in Embodiment 3, if a DR request is a negawatt DR, the priorities of FCEV 11 and BEV 12 for a DR request are determined, taking the risks above into account. Specifically, an amount of time (a float) from a scheduled end time of the operation plan until an electric power supply start time according to a DR request (negawatt DR) is calculated for each of FCEV 11 and BEV 12. When determining a priority of FCEV 11 and priority BEV 12 based on the float of FCEV 11 and the float of BEV 12, a greater weight is set to the float for the priority of BEV 12 greater than a weight set to the float for the priority of FCEV 11. Due to this, the priority of BEV 12, having a lower risk of being unable to be replenished with energy, is higher than the priority of FCEV 11 if the float of FCEV 11 and the float of BEV 12 are the same, for example. This can increase the response probability to a DR request (negawatt DR).

The overall configuration of the electric power system and the configuration of server 100 according to Embodiment 3 are the same as those according to Embodiment 1 shown in FIGS. 1, 2.

Referring to FIG. 7, a procedure of a DR process performed on FCEV 11 and BEV 12, according to Embodiment 3 is now described. The process illustrated in the flowchart is performed on FCEV 11 and BEV 12 participating in DR.

Similarly to Embodiments 1, 2, if determined that a DR request to DER group 500 is a negawatt DR (YES in step S210), server 100 obtains the operation plan of a subject FCEV (step S212), and further obtains the remaining hydrogen level information of the subject FCEV (step S214).

Server 100 then calculates an amount of time (referred to as a "first float" below) from the scheduled end time of the obtained operation plan of the subject FCEV until the electric power supply start time according to the DR request (negawatt DR) (step S216).

Similarly to the subject FCEV, server 100 obtains the operation plan of a subject BEV (step S218), and further obtains the SOC information of the subject BEV (step S220). Server 100 then calculates an amount of time (referred to as a "second float" below) from the scheduled end time of the obtained operation plan of the subject BEV until the electric power supply start time according to the DR request (step S222).

Next, based on the first float of the subject FCEV calculated in step S216 and the second float of the subject BEV calculated in step S222, server 100 determines a priority of the subject FCEV and a priority of the subject BEV for the DR request (negawatt DR) (step S224). Here, for the determination of the priorities, server 100 sets a greater weight to the second float for the priority of the subject BEV greater than a weight set to the first float for the priority of the subject FCEV. For example, if the first float and the second float are the same, server 100 determines the weight of the subject BEV and the weight of the subject FCEV so that the subject BEV has a higher priority than the subject FCEV.

If the subject FCEV has a higher priority than the subject BEV (YES in step S226), server 100 creates an electric power supply plan to be implemented by the subject FCEV, based on the DR request (step S228). The process steps from step S228 to step S236 are the same as the process steps from step S18 to step S26, respectively, of the flowchart according to Embodiment 1 illustrated in FIG. 5 (from step S118 to step S126 of FIG. 6), and are thus not repeated.

On the other hand, if the subject BEV has a higher priority than the subject FCEV (NO in step S226), server 100 creates an electric power supply plan to be implemented by the subject BEV, based on the DR request (step S244). The process steps from step S244 to step S252 are the same as the process steps from step S136 to step S144, respectively, of the flowchart according to Embodiment 2 illustrated in FIG. 6, and are thus not repeated.

Returning to step S210, if the DR request is a posiwatt DR (NO in step S210), server 100 obtains the operation plan of the subject BEV (step S238), and further obtains the SOC information of the subject BEV (step S240). The process steps from step S238 to step S252 are the same as the process steps from step S130 to step S144, respectively, of the flowchart illustrated in FIG. 6, and are thus not repeated.

As described above, in Embodiment 3, if the DR request is a negawatt DR, priorities of FCEV 11 and BEV 12 participating in the DR request are determined based on the first float of FCEV 11 and the second float of BEV 12. This can increase the response probability to the DR request.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A power management apparatus for managing demand and supply of electric power between a power network and at least one vehicle which is electrically connected to the power network and available as a power adjustment resource for the power network, the at least one vehicle including a fuel cell electric vehicle and a battery electric vehicle, wherein the battery electric vehicle and the fuel cell electric vehicle are selectively electrically connected to the power network, the power management apparatus comprising:
  an acquisition unit that
    obtains an operation plan of the fuel cell electric vehicle, and
    obtains, from the fuel cell electric vehicle, information on a remaining hydrogen level available for the fuel cell electric vehicle;
  a determination unit that determines whether the fuel cell electric vehicle is available for a demand response request, based on the operation plan and the remaining hydrogen level information; and
  a charging and discharging control unit configured to:
    create a power supply schedule for the fuel cell electric vehicle based on the demand response request; and
    create a charging and discharging schedule for the battery electric vehicle based on the demand response request,
  wherein when the demand response request is a reduce demand request requesting a reduction in electric power demand;
  the acquisition unit
    obtains an operation plan of the battery electric vehicle, and
    obtains, from the battery electric vehicle, SOC information of a power storage mounted on the battery electric vehicle,
  the determination unit
    calculates a first float indicating an amount of time from a scheduled end time of the operation plan of the fuel cell electric vehicle until an electric power supply start time according to the demand response request,
    calculates a second float indicating an amount of time from a scheduled end time of the operation plan of the battery electric vehicle until the electric power supply start time, and
    determines a priority of the fuel cell electric vehicle and a priority of the battery electric vehicle which are participating in the demand response request, based on the first float and the second float, wherein a weight of the second float for the priority of the battery electric vehicle is greater than a weight of the first float for the priority of the fuel cell electric vehicle, and
  based on the determined priority of the fuel cell electric vehicle and the priority of the battery electric vehicle, the charging and discharging control unit transmits one of:
    a fuel-cell-vehicle command to the fuel cell electric vehicle, causing the fuel cell electric vehicle to supply electric power to the power network based on the power supply schedule; or a battery-vehicle command to the battery electric vehicle, causing the battery electric vehicle to supply power to the power network based on the charging and discharging schedule.

2. The power management apparatus according to claim 1, wherein
when the demand response request is an increase demand request requesting an increase in electric power demand, the determination unit determines that the fuel cell electric vehicle is unavailable for the demand response request.

3. The power management apparatus according to claim 2, wherein
when the demand response request is the increase demand request,
the acquisition unit further obtains an operation plan of the battery electric vehicle and SOC information of a power storage mounted on the battery electric vehicle, and
the determination unit determines whether the battery electric vehicle is available for the demand response request, based on the operation plan of the battery electric vehicle and the SOC information.

4. The power management apparatus according to claim 1, wherein
the determination unit determines whether the fuel cell electric vehicle is available for the demand response request, further based on a price of hydrogen available for the fuel cell electric vehicle.

5. The power management apparatus according to claim 1, wherein
the remaining hydrogen level information is a remaining hydrogen level of a hydrogen tank mounted on the fuel cell electric vehicle.

6. The power management apparatus according to claim 5, wherein
the remaining hydrogen level information further includes information on a hydrogen storage amount of a hydrogen station used by the fuel cell electric vehicle.

7. A power management method for managing demand and supply of electric power between a power network and at least one vehicle which is electrically connected to the power network and available as a power adjustment resource for the power network, the at least one vehicle including a fuel cell electric vehicle and a battery electric vehicle, the power management method comprising:
obtaining an operation plan of the fuel cell electric vehicle; and
obtaining, from the fuel cell electric vehicle, information on a remaining hydrogen level available for the fuel cell electric vehicle;
obtaining an operation plan of the battery electric vehicle;
obtaining, from the battery electric vehicle, SOC information of a power storage mounted on the battery electric vehicle;
determining whether the fuel cell electric vehicle is available for a demand response request, based on the operation plan of the fuel cell electric vehicle and the remaining hydrogen level information;
creating a power supply schedule for the fuel cell electric vehicle based on the demand response request; and
creating a charging and discharging schedule for the battery electric vehicle based on the demand response request,
wherein when the demand response request is a reduce demand request requesting a reduction in electric power demand,
calculating a first float indicating an amount of time from a scheduled end time of the operation plan of the fuel cell electric vehicle until an electric power supply start time according to the demand response request;
calculating a second float indicating an amount of time from a scheduled end time of the operation plan of the battery electric vehicle until the electric power supply start time;
determining a priority of the fuel cell electric vehicle and a priority of the battery electric vehicle which are participating in the demand response request, based on the first float and the second float, wherein a weight of the second float for the priority of the battery electric vehicle is greater than a weight of the first float for the priority of the fuel cell electric vehicle, and
based on the determined priority of the fuel cell electric vehicle and the priority of the battery electric vehicle, transmitting one of:
a fuel-cell-vehicle command to the fuel cell electric vehicle, causing the fuel cell electric vehicle to supply electric power to the power network based on the power supply schedule; or
a battery-vehicle command to the battery electric vehicle, causing the battery electric vehicle to supply power to the power network based on the charging and discharging schedule.

\* \* \* \* \*